United States Patent
Levitan (10) Patent No.: US 7,720,351 B2
(45) Date of Patent: May 18, 2010

(54) PRESERVATION AND IMPROVEMENT OF TELEVISION ADVERTISING IN DIGITAL ENVIRONMENT

(76) Inventor: Gutman Levitan, 101 Grove St., #11, Stamford, CT (US) 06901

( * ) Notice: Subject to any disclaimer, the term of this patent is extended or adjusted under 35 U.S.C. 154(b) by 1039 days.

(21) Appl. No.: 11/096,423

(22) Filed: Apr. 4, 2005

(65) Prior Publication Data
US 2006/0222322 A1    Oct. 5, 2006

(51) Int. Cl.
*H04N 5/91* (2006.01)
*G06F 3/00* (2006.01)
(52) U.S. Cl. ............................. 386/68; 725/42
(58) Field of Classification Search .......... 725/32, 725/34, 35, 22, 42; 386/68
See application file for complete search history.

(56) References Cited

U.S. PATENT DOCUMENTS 6,772,209 B1 * 8/2004 Chernock et al. ......... 709/225
2003/0051151 A1 * 3/2003 Asano et al. ............. 713/193
2005/0163480 A1 * 7/2005 Takemoto ................ 386/69
2005/0190794 A1 * 9/2005 Krause et al. ............ 370/485
2006/0031892 A1 * 2/2006 Cohen .................... 725/88
2006/0287956 A1 * 12/2006 Higashi et al. ............ 705/51

* cited by examiner

*Primary Examiner*—Marsha D Banks Harold
*Assistant Examiner*—Asher Khan
(74) *Attorney, Agent, or Firm*—Ilya Zborovsky (57) ABSTRACT

A system for protecting commercials included in a digitally distributed and recorded video that minimizes user's inconveniences resulting from restrictions imposed on playback of the video. The video is encrypted at the distributor side and playback of the encrypted video at the user side is limited in such a way that fast forward and reverse playing is not performed, and a lower limit is imposed on skip forward and backward so that only parts of video whose playing time is greater than the time of typical commercial break can be skipped. This arrangement prevents a user from selectively skipping commercials without missing pieces of program itself and thus discourages skipping when the user wants to watch an entire program, but still enables quick browsing before watching the entire program as well as moving fast to any part of the program for watching that part again.

5 Claims, 7 Drawing Sheets

How do you feel about advertisement of
HOME GOODS?

Select one of five:

1. Very negative
2. Negative
3. Neutral
4. Positive
5. Very positive

< - Previous     ^ - Return     > - Next

Fig. 6

Commercial Tiers

| A | B | C | D | E |
|---|---|---|---|---|
| 5 | 4 | 3 | 2 | 1 |

Distributor's Rates

Viewer's Response

| 1 | 2 | 3 | 4 | 5 |
|---|---|---|---|---|
| -3 | -2 | 0 | +2 | +3 |

Rate Change

Fig. 7

|   | 1 | 2 | 3 | 4 | 5 |
|---|---|---|---|---|---|
| A | 2 | 3 | 5 | 7 | 8 |
| B | 1 | 2 | 4 | 6 | 7 |
| C | 0 | 1 | 3 | 5 | 6 |
| D | -1 | 0 | 2 | 4 | 5 |
| E | -2 | -1 | 1 | 3 | 4 |

Profile Rates

PRESERVATION AND IMPROVEMENT OF TELEVISION ADVERTISING IN DIGITAL ENVIRONMENT

BACKGROUND OF THE INVENTION

This invention relates to information technology for television and more particular, to digital video recorders (DVRs) and digital rights management (DRM).

Digital media files can be easily copied and distributed without any reduction in quality and as a result, they are being widely distributed on the Internet through both authorized and unauthorized distribution channels. DRM systems maintain control over intellectual property distribution defining rules for delivery, playing and copying. Limitations on playing usually include start and end time, maximum duration and maximum count, i.e. single play or limited number of plays. Typically, a DRM system protects intellectual property by either encrypting data so that it could only be accessed by authorized users or marking the content with a digital watermark or similar method thereby warning that the content may not be freely distributed.

While this invention contributes to DRM in general, it addresses first of all a specific problem: skipping commercials by users of digital video recorders (DVRs).

Since introduction of VCR television viewers can record any television program, watch it at the time of their choice and skip commercials using a fast forward button on the remote control. For decades it has no impact on television advertising because viewers have been using VCRs much more for playing rented tapes than for recording transmitted programs. But DVR is, in fact, a computer that records video data on its hard drive and uses intelligence inherent in computerized systems to make the recording easier. Today DVRs automatically record television series and in the nearest future they will do the same for all genres including movies. Users will watch more recorded than "live" programs and skip commercials in the programs. All major consumer electronics companies manufacture DVRs coupled with DVD players and personal computer manufacturers are building multimedia units capable of receiving, storing and playing television programs. The largest cable and satellite operators have already made DVR equipment and services available to their subscribers.

Unlike videotape, which is a sequential access medium, hard disk drive is direct access storage. While VCRs allow sequential fast forward and fast reverse movements, DVRs may allow instant jumps to any part of stored program. DVR pioneers, TiVo and ReplayTV, provided buttons on the remote control to jump 30 second forward over a commercial and 7 seconds backward for a "correction", if required. Cable operators do not offer this feature in cable boxes to avoid a legal battle with media companies but with digital fast forward, users can get through a typical 2-minute commercial brake in about 30 seconds. In no way this compromise can prevent users from skipping commercials.

Currently there are a number of ideas how to "punish" users that are trying to skip commercials. TiVo is experimenting with running a 90-second advertisement when user fast forward through a 30-second commercial. A similar idea is disclosed in the published application Ser. No. 10/481,151 filed by Kelly at al. Consumer however could fight back giving preference to harassment-free products and services.

It seems the new video recorders are going to take away a powerful tool that television gave advertisers a half-century ago. And as a result, free television programming funded by advertisement is about to be history together with television commercials.

Fortunately DRM approach can help to keep free programming alive. Paradoxically, in the digital age free television programming needs DRM protection. At the same time DVR, as a device with high-capacity storage and intelligence, has a potential to dramatically improve the technology of advertisement.

SUMMARY

Accordingly, it is an object of the present invention to protect television commercials in a video distribution system with digital video recorders by imposing a limitation on fast forward and fast reverse operations in such a way to prevent users from selectively skipping commercials while not missing parts of entertainment program in which the commercials are included.

Another object of the invention is enforcement of DRM limitations in a distribution environment wherein the recipient side is essentially out of control.

A further object is an improvement of television advertisement by providing alternative commercials, i.e. playing different commercials with the same video program depending on user's information privately stored in the recipient system.

A still further object of the invention is an improvement of television advertisement by supplementing commercials with purchase and other information that can be unloaded in the recipient system on demand when a commercial is played. The unloaded information can be reviewed later while the video program can be watched without interruption.

A still further object is integration of television and Internet advertising thereby providing a highly automated home shopping.

In keeping with these objects and with others, which will become apparent hereinafter, the present invention consists, briefly stated, in distributing a scrambled video program together with a video player that descrambles the program and limits playing to conditions defined by the program distributor, in particular preventing users from selectively skipping commercials while not missing parts of the entertainment program itself.

The novel features, which are considered as characteristic for the present invention, are set forth in the appended claims. The invention itself, however, both as to its construction and its method of operation will be best understood from the following description of specific embodiments when read in connection with the accompanying drawings.

DESCRIPTION OF THE PREFERED EMBODIMENT

The direct way to protect commercials in recorded video programs is disabling all types of fast forward movement during playback. However such a measure applied to all stored video programs would cripple DVR making it inferior to VCR while it is meant to be superior. The method of this invention consists in defining a lower limit on fast forward and fast reverse operations so that pressing the fast forward or fast reverse button on the remote control would cause a jump exceeding a typical commercial break. For example, if the lower limit is 3 minutes, a video distributor may vary commercial breaks from 30 seconds to 2 minutes so that jumping over a commercial a DVR user would miss from 1 to 2.5 minutes of entertainment program itself. This limitation does not prevent the user from going fast through a stored video to decide whether it is worth watching. It also does not prevent the user from going directly to any part of the video to watch that part again. However the limitation discourages the user to skip commercials when he wants to watch a whole movie or other television program.

The user can move forward and backward even faster, for example with 15-minute jumps, pressing the fast forward or fast reverse button twice during 0.7 second.

The lower limit on fast forward and fast reverse operations is to be enforced by a DRM technique. DRM is usually implemented as a client/server system: server encrypts a digital content with a secret key and authorized clients, provided with the key, decrypt the content and play it with limitations defined by a content distributor. This way DRM can be enforced in an environment where recipient devices, such as cable boxes and satellite receivers, are provided to subscribers by the content distributor.

However nobody likes limitations and authorized users may not like them as well. A user can download in its PC an "illegal" player that does not enforce DRM limitations. (There will be no shortage of web sites providing such a player.) Then the user will be able to watch recorded videos on either computer monitor or TV screen and skip commercials.

Video Objects. This lack of control of the recipient side shows that DRM has to be ensured at the transmitting, i.e. distributor side. A feature of this invention consists in distributing videos as video objects that "play themselves" and do it on conditions defined by distributor. The video object is an encrypted video file distributed together with a DRM video player. The encryption key is locked inside of the player and the encrypted video cannot be played by other player that is not provided with the key. Although it may sound like delivery of videotape together with VCR, it is not the case. First, the addition of software player results in less than 0.5% increase in transmission time and storage because an average 1-hour MPEG video has a volume of 1-2 GB while a video player requires 1-3 MB. Second, "distributed together" does not necessarily means "transmitted together". It only means that both video file and video player have to be available in the recipient system at the time of playback. Third, the player could be shared by many videos, for example by those transmitted on a particular channel during a particular period of time.

Figure 1:
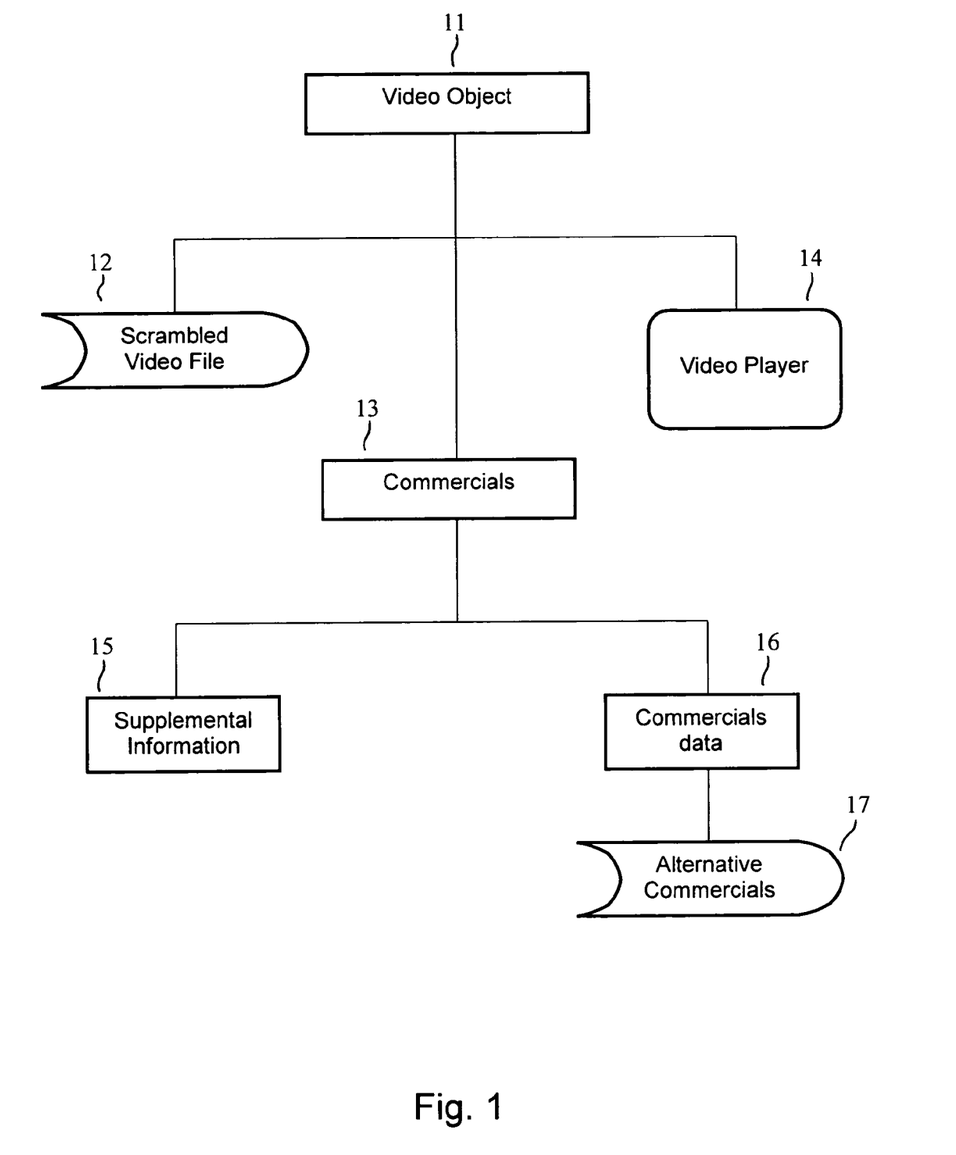
FIG. 1 is a video object diagram according to the invention.

In FIG. 1, which is a video object diagram, an object descriptor (data record) 11 links a video file 12 to a video player 14. The video file is encrypted with a secret key and the key is provided to the player at the time of video object generation at the transmitting side, i.e. before the object is distributed to recipient systems. Descriptors identify objects and their components while components of the same object could be transmitted to recipient systems together or separately. In particular, a descriptor 15 indicates presence of supplemental information for some commercials and links commercials with the information. A descriptor 16 indicates presence of alternative commercials and provides data of those commercials to be compared with users data stored in recipient systems.

Figure 2:
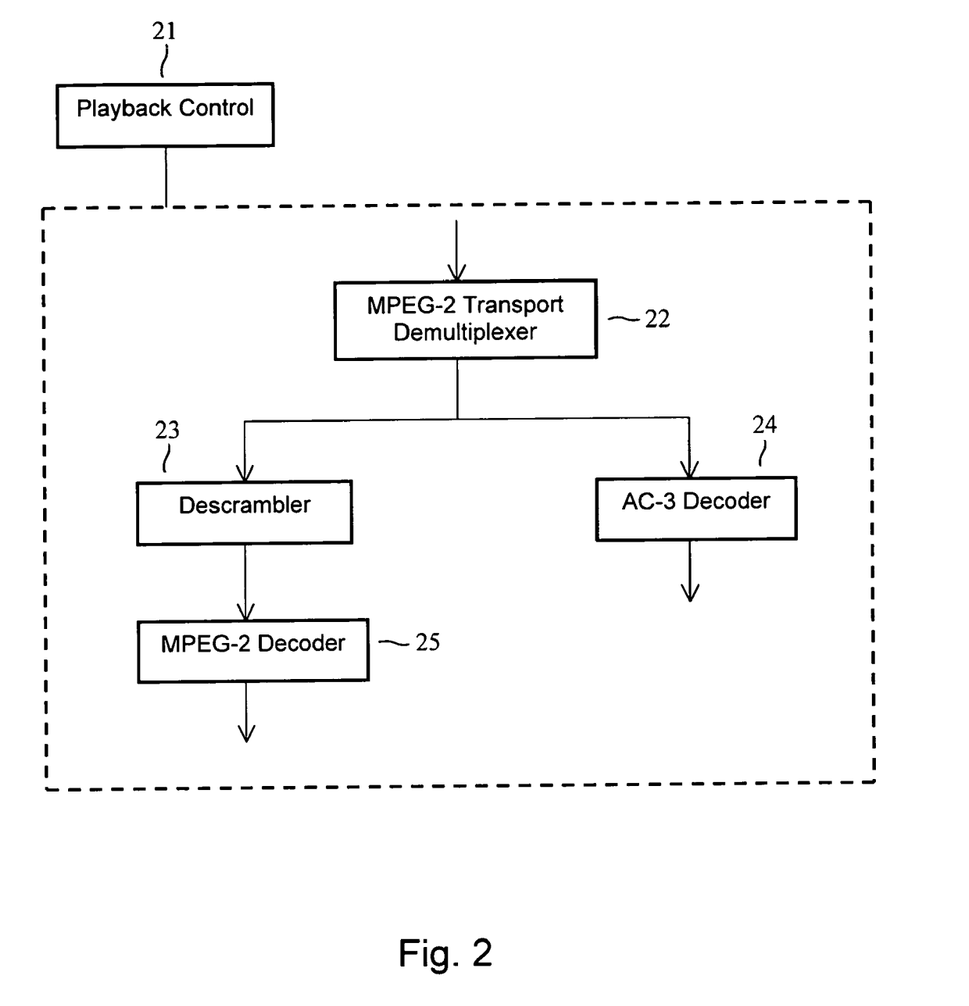
FIG. 2 is a functional diagram of video player according to the invention.

The video player in FIG. 2 comprises MPEG-2 transport demultiplexer 22, descrambler 23, MPEG-2 decoder 25, AC-3 decoder 24 and playback control 21. MPEG, which stands for Moving Picture Experts Group, is a technique for digital compression of a video signal using separate video and audio encoders, and for transmission of the compressed content as a single transport data stream. MPEG-1 format was developed for DVD, MPEG-2—for digital video broadcast and MPEG-4—for video on demand. The audio encoding scheme is either MP3 or DTS or Dolby Digital AC3 (also known as Dolby Digital 5.1). In FIG. 2, MPEG-2 transport demultiplexer separates audio and video data. The descrambler decrypts both data streams or the video stream only if audio is not scrambled. MPEG-2 decoder provides video decompression and AC-3 decoder—audio decompression. The playback control drives execution of the video object and enforces DRM limitations: a lower limit on fast forward and fast reverse movements, and expiration date.

The limit is a variable parameter defined at the time of video object generation at the transmitting side. Also the distributor can selectively disable the 3-minute "one-click" jumps and still allow the 15-minute "double-click" ones to further protect expensive commercials included in popular television programs. And complete disabling of fast forward for some programs is still an option also it seems to be unnecessary.

The time limit is important because in many cases advertisement is time sensitive. The time limit could also differentiate pay-per-view, rent and purchase distribution models.

At the time of video object generation at the transmitting side the encryption key is embedded into the descrambler and the descrambler is securely encapsulated in the player. Any other player preinstalled or downloaded in a recipient system and not provided with the key is not able to play the scrambled video. Free television programming does not need authorization but if an authorization is required the embedded key itself is encrypted with an additional key and that additional key is provided to authorized recipient systems only. Then for playing a scrambled video a player needs both the encrypted key locked inside of the player and the additional key distributed to authorized recipients. This way the method of the invention provides both a limited access to a content and the content playing limited to conditions defined by the content distributor.

Another advantage of this distribution method is that many different cryptographic techniques can be used without disruption of the client/sever arrangement. If a technique is compromised by hackers it just will not be used any more while such an event will have no impact on users and their systems. Also different video compression techniques may apply to different content without any change to the recipient systems. For example, a compression technique that is optimal for theater-like show is not optimal for action-packed movie or sport event. Thus this method helps to balance quality and efficiency of video distribution.

Integrated Distribution System. Digital television is gradually shifting from the one-way channel-oriented model to an interactive content-oriented model. The first step in this direction is video on demand (VOD). VOD system provides each user with a separate video stream and in this sense it is similar to the Internet. However the one-to-one delivery wastes Internet resources and creates traffic jams. Delivery of movies and other television programs not from a local source but from Internet sources would clog the Internet. A technology that puts together interactivity of the Internet and congestion-free content delivery inherent in broadcast systems was disclosed by applicant in U.S. Pat. Nos. 5,864,823 and 6,698,023 B2, and pending application Ser. Nos. 09/829,255 and 10/165,537 which are incorporated herein by reference. This bandwidth-saving technology turns on green light for high-quality video as feasible Internet content. The inventive system further facilitates free video content on the Web funded by advertisers.

Figure 3:
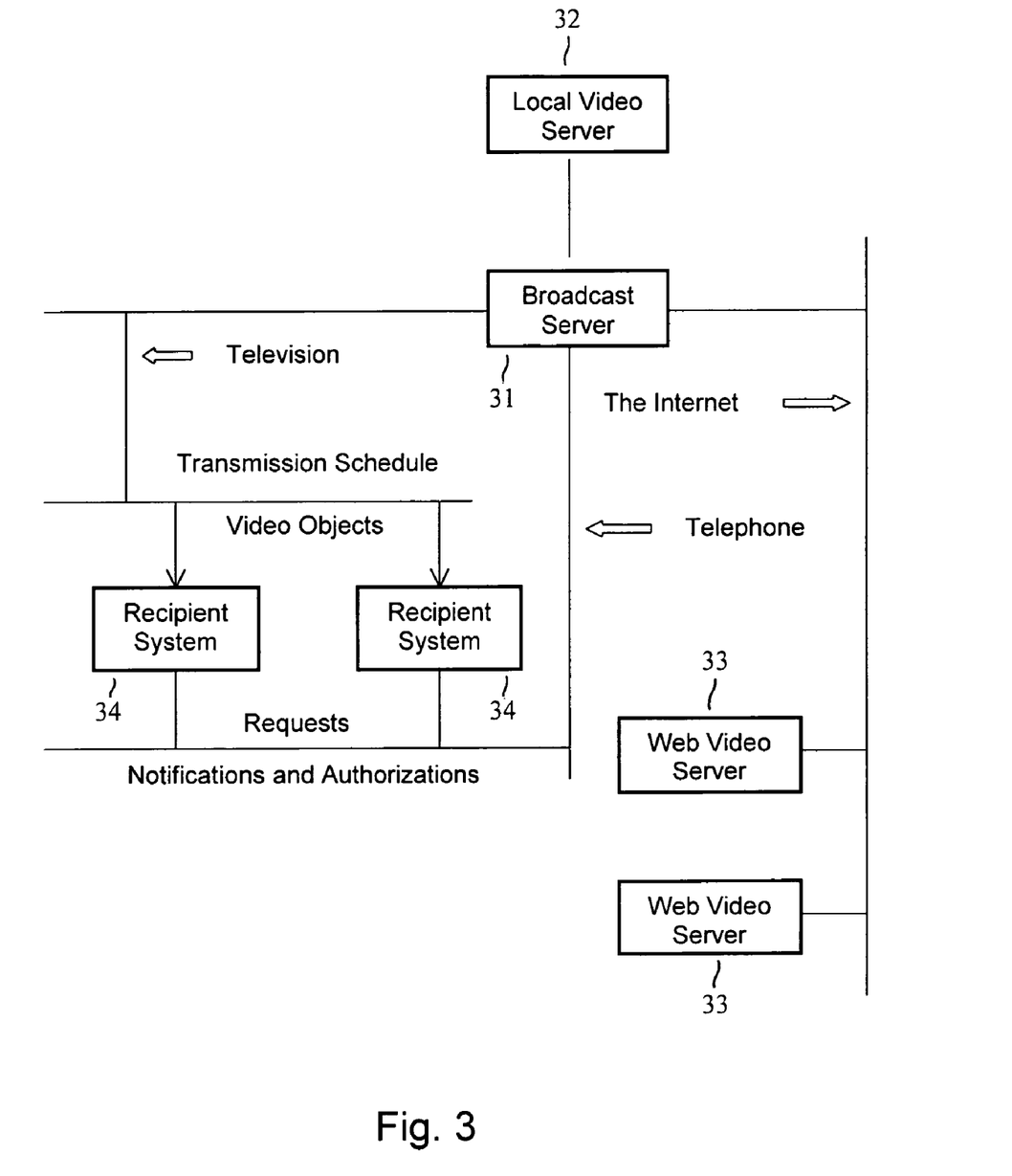
FIG. 3 is a view of integrated video distribution system.

FIG. 3 shows an integrated system that provides both one-way and interactive video distribution. For interactive distribution, video objects are posted on a local video server 32 associated with a broadcast center and/or on web video servers 33 located anywhere in the world. A broadcast server 31 provided at the broadcast center and connected to the Internet downloads a single copy of video object, i.e. object descriptor, video data and video player from the local server or a web server, no matter how many users have requested the video, and then retransmits the copy via a television medium such as cable, satellite or over-the-air terrestrial broadcast so that recipient systems 34 whose users ordered the video could download it simultaneously. The server includes descriptors of objects scheduled for broadcast transmission in a schedule transmitted via a television channel. In order to reduce the size of the schedule, descriptors of objects requested by one or few users could be included in individual notifications delivered via a two-way addressable network such as telephone. The telephone connection is not necessary in cable TV network upgraded for cable modem.

Recipient systems automatically download a video object, i.e. video data and video player, when the object is transmitted, store the object on their hard drives and present the video to each user on request at the time selected by user. Having dozens of hours of video content already available on his hard drive, the user would apparently tolerate a delayed delivery of additional content.

This way of video content delivery via the "hybrid" Internet/television infrastructure has important advantages. First, users can order video content posted on web sites located anywhere in the world. Second, the very large video files are brought to the broadcast center temporarily for transmission on a schedule and therefore do not need to be stored there permanently. Third, a single copy is delivered to all users, not a separate copy to each user, which dramatically reduces Internet traffic. Forth, the single copy is delivered via the Internet to the broadcast center in advance, not in real time, and therefore the copy could be transmitted according to TCP protocol that provides error handling and flow control. Real-time protocols for streaming video/audio transmission, Internet telephony, video conferencing and so on are built on the top of UDP protocol and do not provide error correction and flow control thereby lowering quality of delivered content and contributing to Internet congestion. Fifth, videos are not watched when transmitted and therefore video files could be downloaded in recipient systems faster than in real-time e.g., over fiber-to-the-home, or slower e.g., over DSL.

Components of downloaded video object may be placed in different parts of recipient system: the video file is stored in a video library, the player—in a library of video players and descriptor that links the video file with the player—in a guide database.

Figure 4:
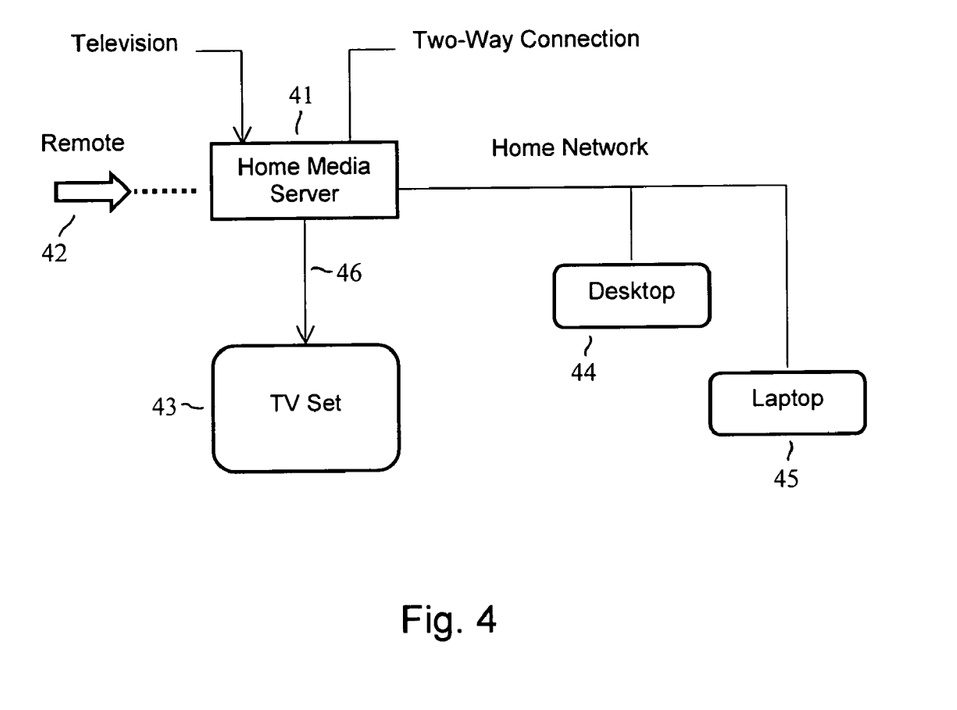
FIG. 4 is a view of integrated recipient system.

FIG. 4 shows an integrated recipient system that is built around a home media server 41, which is a cable or satellite receiver with built in computer or a computer with tuner card. The media server is connected to the broadcast server, as it is shown in FIG. 3, over a one-way television and a two-way network such as telephone. The server has different types of video output 46 for connection with a TV set 43, such as RF channel 3/4 output for older TV sets, analog baseband S-Video offering a higher quality signal and digital Component video sent down on a few wires. One or more desktop 44 and/or laptop 45 computers are connected to the server via a conventional computer network, wired or wireless, and therefore the computers may be located anywhere in the home. This integrated system provides the most comprehensive user interface to conventional television, interactive television and the Internet.

In the conventional television mode, viewer does not order television programs but selects them from those transmitted on hundreds of channels 24 hours a day 7 days a week. The upside of this mode is that viewer does not need to plan the home entertainment. With a resident recorder/player in the recipient system, user can record analog video signals and digital video streams not protected by method of this invention. Then user can endlessly store and freely distribute recorded videos, and skip commercials during playback. For protected (encrypted) videos, players are transmitted and downloaded in the recipient system in an early morning process. The process removes (deletes) all expired objects, both video files and video players to free space for new objects. Each television channel, which is an independent enterprise, may have its own current player, i.e. the player for the day. While 200 players seem to be a lot, in terms of download time and storage they are equal to a 30-minutes video. However sharing players by a group of channels is still an option.

Figure 5:
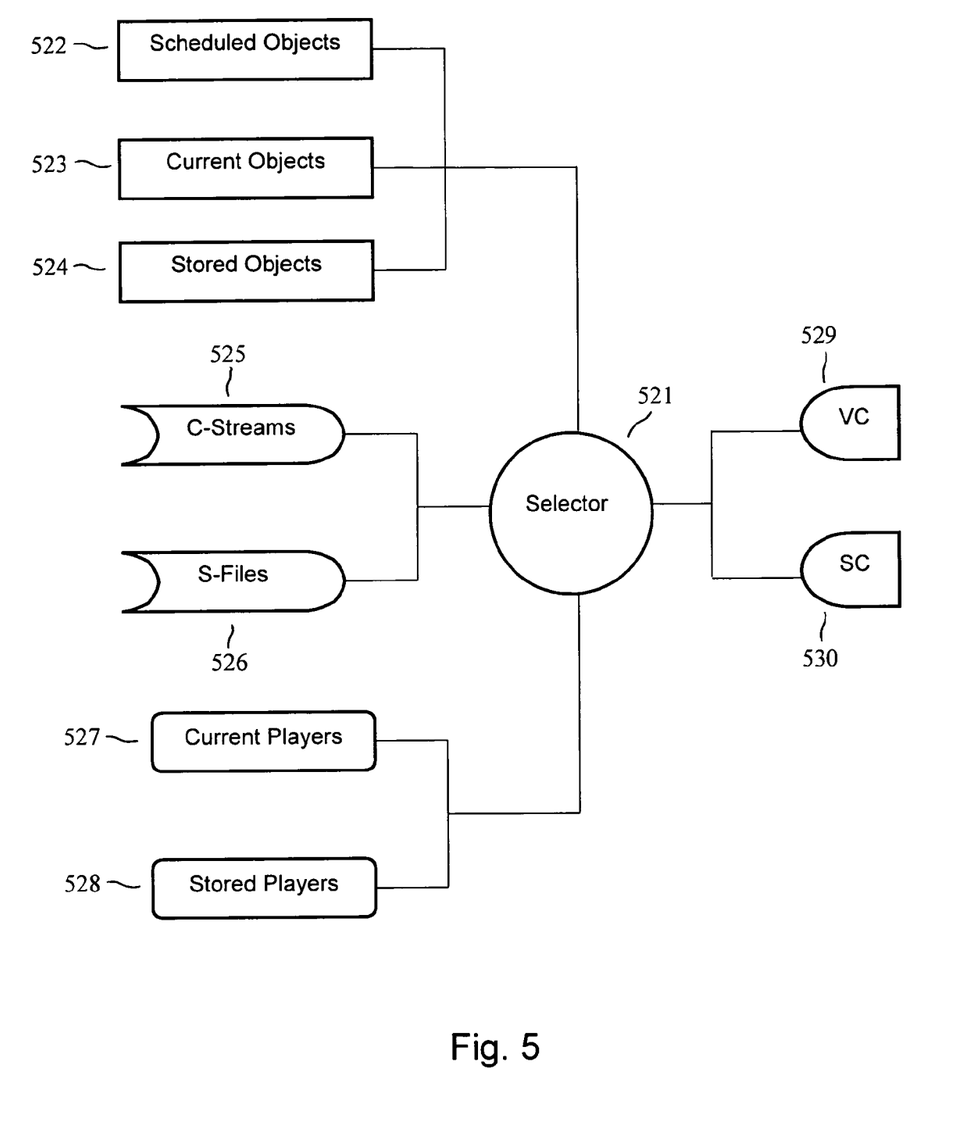
FIG. 5 is a functional diagram of recipient system playing video objects.

In FIG. 5, which is a functional diagram of recipient system, object descriptors stored in a guide database represent scheduled for transmission objects 522, currently transmitted objects 523 and stored (downloaded) objects 524. The descriptors link stored video files 526 with their stored players 528 and current video streams 525, i.e. video data currently transmitted on different channels, with current players 527 assigned to the channels. The guide database specifies a transmission time and a channel for each scheduled or currently transmitted object.

The guide database information relevant to user is presented via an on-screen interactive guide. User can play any stored or currently transmitted video selecting it from the guide. If user selects a stored video, an object selector 521 uses the file and player information in the descriptor to provide playing of proper file with proper player. If user selects currently transmitted videos by switching channels the object selector calls the current players linked to the channels. If user selects a currently transmitted video via the guide, the object selector uses the channel and player information in the object descriptor to switch the tuner to the proper channel and call the player linked to the channel.

The descrambled and decompressed video stream is directed to a video card 529, which is a graphics overlay processor responsible for onscreen display generation. The decompressed audio stream is directed to sound card 530 providing audio synthesis.

User can select for recording any currently transmitted or scheduled object via the interactive guide. The "recording" is in fact, downloading of a compressed MPEG transport data stream without playing, i.e. without demultiplexing, descrambling and decompressing, and saving a current player linked to the stream. The saved current player becomes the stored player. Saved object descriptor, video file and video player are stored in the recipient system until the expiration date or until the user deletes the object via the interactive guide. In case of recording of viewed video, downloading and playing are performed concurrently.

Playing Video Objects. In computer programming, objects are described in terms of "methods", "properties" and "events". Microsoft Windows Media Player is a good example used in this application. The player control provides Play, Stop and Pause methods to start, stop, and pause playback of a selected video file. It also provides Rate property for changing speed of the playback. When user presses Play button on the remote control or clicks the button on the computer screen, Play method is called. But in the inventive system, playback control (FIG. 2) stores the object expiration date provided at the time of video object generation and requests the current date before calling Play method. If it finds that the object has expired the playback is not executed and an appropriate message is displayed on the television screen.

As to skipping commercials, Windows Media Player has two methods and two properties relevant to the issue. FastForward method rapidly scans forward through the currently played file and FastReverse method rapidly scans backward. Another way to fast-forward and fast-reverse is setting the Rate property. This property acts as a multiplier value that allows playing at a faster or slower speed. The default value is 1.0. Values less than 1 represent slow motion, a playback rate of 2 equates to twice the normal speed and negative values indicate reversed playback. Another property, CurrentPosition is used to set playback to an arbitrary point in a video file. It is measured in seconds from the start of the file. For example, to "rewind" a file after it has been stopped, CurrentPosition is set to 0.

In the inventive system, playback control does not call FastForward and FastReverse methods, and does not change the Rate property. Whenever user presses the fast forward button on the remote the playback control changes CurrentPosition adding 180 to its value and thereby causes a 3-minute jump forward. Whenever user presses fast reverse button the playback control changes CurrentPosition subtracting 180 from its value and thereby causes a 3-minute jump backward. If the duration of commercial break does not exceed 3 minutes, this way of functioning of video player prevents users from selectively skipping commercials while not missing parts of entertainment program itself. The "180" and maximum duration of commercial break are variable parameters provided at the time of video object generation. If some but not all commercials breaks exceed the maximum, it will not help users in skipping commercials but only add confusion. Thereby the user is discouraged to skip commercials if he wants to watch the whole program. At the same time, the user still can advance with 3-minute jumps to any part of entertainment program. The user can move forward and backward even faster, for example with 15-minute jumps, pressing the fast forward or fast reverse button twice during 0.7 second, which causes change of CurrentPosition for +900 or −900 respectively.

Another point of DRM concern is the decrypted video/audio stream on the way from the video player program to the video card and sound card. The stream can be intercepted, encoded, recorded and then played without DRM limitations. For example, SoundCapture program from Magicsofts Studio is available on the Internet. The program intercepts stream audio on its way to the sound card and records it with MP3 real-time encoding. For that reason, Microsoft has developed a Secure Audio Path technology. In Windows Millennium, Windows XP and future versions of the Windows, the data path is protected inside the operating system. The protection is based on certification of all downstream components including the sound card driver. If operating system detects an unauthorized component in the path it will signal the player not to decrypt the data stream. It means that Windows Media Player works only with specific certified software and hardware. Apparently Microsoft will develop a secure video pass as well.

However for protection of commercials the secure video/audio pass is not necessary. Users skip commercials to save time spent on viewing a video program in which commercials are included. But interception of decrypted video stream does not save time. To playback a video program without commercials the entire program with commercials needs first to be played, intercepted, encoded and recorded. It would make sense if the "initial" playing could be performed at a faster than normal speed. Windows Media Player allows to make it by calling FastForward method or by setting the Rate property. But as stated above, in the inventive system the playback control does not call FastForward method and does not change Rate property thereby excluding such a possibility.

Alternative Commercials. DVR is a combination of television receiver and computer and the intelligence inherent in computerized systems could be used for both preservation and improvement of television advertisement. One way of improvement is providing alternative commercials, i.e. playing different commercials with the same video program depending on user's information privately stored in the recipient system. As a result, users watch more relevant and less annoying commercials while advertisers benefit from consumer information without having an actual access to the information.

The concept of alternative commercial has been introduced by Levitan et al. in pending application Ser. No. 09/732,695 that is incorporated herein by reference.

Figure 6:
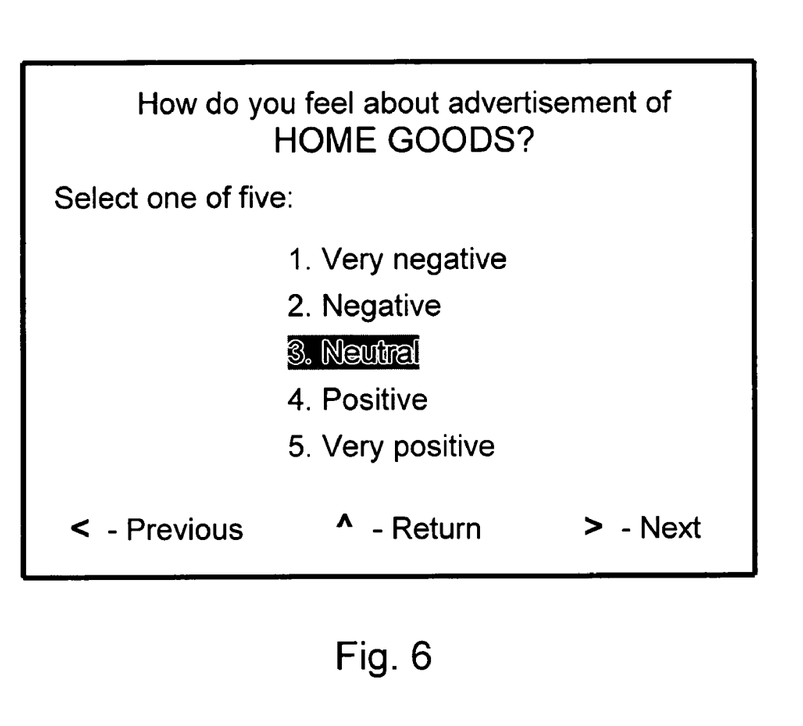
FIG. 6 is an example of profile development screen for alternative advertisement.

User sets his consumer profile in a profile development session. He enters and exits the interactive session by pressing a button on the remote control. In the session, the system presents questions about user himself and his attitude to advertisement of different types of products, and provides a multiple choice of answers as shown in FIG. 6. The personal information may include gender, age range and income range. ZIP code in user's profile facilitates alternative local ads for satellite television. User selects an answer by pressing the number of the answer on the remote control. All user's responses are stored in a user profile database. It is up to the user how much to customize his profile. The default answer to all questions is "Neutral" and with the default the commercials are selected for playing according to distributor preferences.

Figure 7:
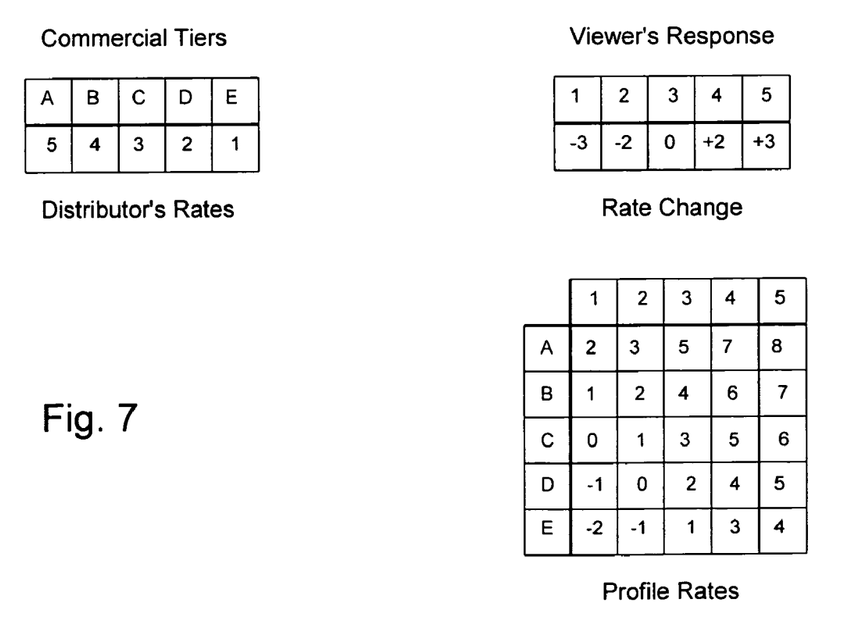
FIG. 7 illustrates a process of selecting alternative commercials.

In addition to the indirect access to consumer information, advertisers may benefit from a flexible system of payment. The distributor may break all commercials into priority tiers and charge advertisers differently for different tiers. The most expensive will be "non-replaceable" commercials. This is, in fact, all what distributors currently have and will have as an option. As shown in FIG. 7, alternative commercials are assigned to one of five tiers from A to E. Each commercial competes for a chance to be displayed according to its rate, which is 5 for tier A, 4 for tier B and so on. If a user does not set his profile for a particular type of products, promotions of those products will compete with distributor rates. However the rate is changed if the user selects an answer different from "Neutral". For example, if the user is "positive" about home goods and a commercial of a product in this category is in tier C, the commercial will compete with profile rate 5, not with distributor rate 3. Therefore, while there are many types of advertised products and services the user may set his profile only for those types he likes or dislikes. For example, a first-time homebuyer could be "positive" about home goods while a weight-watcher could be "very negative" about late-night food ads.

In addition to the flexible system of payment, alternative commercials may be permissible for prescription drugs, tobacco, liquor and other products restricted or prohibited for television advertisement because being placed in lower tiers they are not displayed unless they are "invited" by user's profile. For the same reason alternative commercials may be more liberal in respect to a controversial content, which is a trend in television advertisement.

The most efficient platform for alternative advertisement is the system for delivery of video objects on-demand via the hybrid Internet/television infrastructure described above with the reference to FIG. 3. A set of alternative commercials is defined at the time of video object generation so that the number of commercials would be greater than the number of vacant places in commercial breaks. The commercials are incorporated into a video object by the descriptor 16 shown in FIG. 1. For each commercial the descriptor specifies a type of advertised entity and a tier to which the commercial is assigned. In the video program, starts of commercial breaks are identified by markers while all commercials are defined as separate video files. The video object is delivered from a web server to recipient systems as a whole, i.e. with all commercials defined for the object.

In each recipient system a commercial manager application reads the descriptor 16 of the downloaded object, compares commercials data with user's profile data, selects commercials as described above with reference to FIG. 7 so to fill commercial breaks and deletes all not selected commercials. This way an unlimited number of alternative commercials can be provided for a video program.

A commercial break in a video program is identified by a marker. In Windows Media Player a marker is a pointer to a specific time in a video file written into the file. MarkerHit event provides notification when a marker is encountered during file playing and CurrentMarker, GetMarkerName and GetMarkerTime methods retrieve marker information. When video player encounters a marker identifying a commercial break the playback control 21 (FIG. 2) stops the video program in current position and starts playing commercials assigned to the commercial break. After the commercials have been played the playing of video program is resumed. Whenever user presses fast forward or fast reverse button on the remote control, the playback control calculates the next current position as if the video program and commercials were chained in a single continuous file.

Alternative commercials could be provided also for one-way conventional television and in particular, for "live" television programs, i.e. programs viewed when transmitted. For this purpose, all commercials are divided in two groups: primary commercials, which are selected according to distributor preferences and inserted in television programs, and alternative commercials, which are defined as possible replacements of primary commercials. Alternative commercials are not inserted in television programs but transmitted as separate video files on auxiliary channels allocated for transmission of alternative commercials. Both primary and alternative commercials are specified in the video object descriptor stored in the guide database.

Figure 8A:
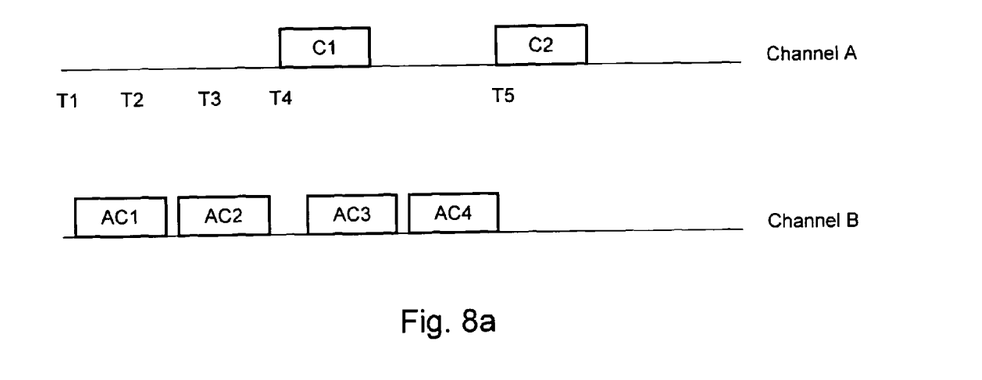
FIG. 8 is a time diagram of alternative commercials.

In the time diagram of FIG. 8a, primary commercial C1 and C2 are included in a television program transmitted on channel A while alternative commercials AC1-AC4 are transmitted on channel B. When the television program is selected for viewing in a recipient system, the commercial manager application reads the object descriptor and decides whether AC1 or AC2 is more appropriate for the viewer than C1 according to the viewer profile. If it is the case, then one of the two will be downloaded in the recipient system to be played instead of C1. When video player encounters a marker identifying the start of C1 the playback control stops the video program in current position and plays the downloaded alternative commercial. Then the duration of C1 is added to the current position to skip C1 and playing of television program is resumed.

Figure 8B:
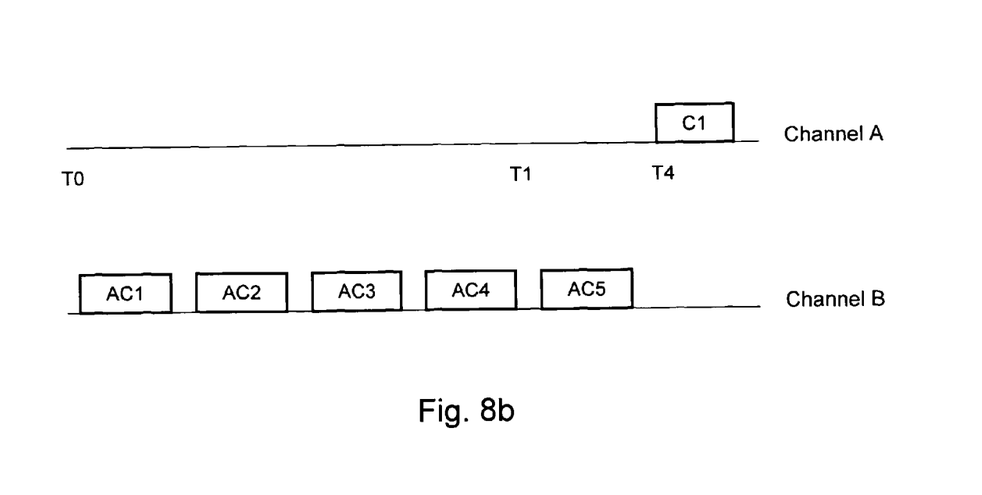

As it is obvious from the time diagram of FIG. 8a, alternative commercials are actually available for replacement of a primary commercial in a live program if they are transmitted inside of a time interval between the start of the program and the start of the primary commercial, such as the T1-T4 time interval for C1 and T1-T5 for C2. Moreover, if the television program is selected for viewing not on or before its start time T1 but later at T2, then only AC2 is available as possible replacement for C1. If the program is selected for viewing at a later time T3 then no alternative is available for C1 and it is played no matter what is in the viewer profile. However television programs selected for recording long before their scheduled transmission can be served with alternative commercials more efficiently. In FIG. 8b, T0 is a time of selection of a program for recording, T1 is the start of transmission of the program and T4 is the start of primary commercial C1 inserted in the program. Any alternative commercial AC1-AC5 transmitted inside of T0-T4 time interval is available as a possible replacement for C1.

Interactive Commercials. Another way to improve television advertisement is supplementing commercials with purchase and other information included in video object. When a commercial is played a message is displayed on the television screen prompting user to order the supplemental information related to the commercial. If the user responds to the message pressing a button on the remote control, the information is saved in the recipient system. The information can be reviewed later while the video program can be watched without interruption.

The supplemental information, preferably in the format of web pages called HTML or XML, is included in MPEG transport data stream at the end of commercial. When video player encounters a marker identifying a start of commercial, the playback control produces a message "Press S for further information" on the top or bottom of television screen. The message stays on the screen to the end of commercial or until user presses the "S" button on the remote control. When video player encounters a marker identifying the end of commercial, the playback control pauses playing and checks user's response. If user has positively responded to the message, the supplemental information is unloaded from MPEG transport data stream into the recipient system. The pause produces no visual effect on the television screen because it is very short: the speed of TV channel allows transmission of hundreds of pages with still picture and text during a second.

Being implemented in the integrated recipient system described above with the reference to FIG. 4, this feature provides a highly automated home shopping. If user responds with the remote control 42 to the message on the screen of TV set 43, the supplemental information will be unloaded into an interactive store, which is a compiled "web site" on the hard drive of media server 41. The store can be accessed via the home network with a web browser that displays web pages on the monitor of desktop 44 or laptop 45. This way the information can be viewed and the advertised product can be ordered. The user can generate an order with just a click of mouse because product information and advertiser's e-mail address are included in the supplemental information while user's name, mailing address and credit card number are stored in the user profile database. In addition, the supplemental information may contain a link to advertiser's web site inviting users to visit the site.

This integration of television and Internet advertisement creates opportunities never before available. For example, the law prohibits advertising of prescription drugs without a complete list of warnings and restrictions. A commercial, which typically occupies TV screen for 30 seconds, just can't do that. The integrated system resolves the problem supplementing video commercials with text and data, and connecting user with wealth of related information available on the Web.

Although the invention is described herein with reference to the preferred embodiment, it is to be understood that modifications can be made by those skilled in the art without departing from the spirit or scope of the invention. Accordingly, the invention should only be limited by the claims included below.

What is claimed is:

1. A system for protecting commercials in a digitally distributed and recorded video that minimizes user's inconveniences caused by restrictions imposed on playback of the video, comprising:

at the distributor side, a video server for encrypting video data of a video program and commercials included in the program in order to prevent playing the video data with a video player not provided with a proper encryption key; and at the user side, a video player provided with the proper encryption key for playing the encrypted video data, wherein user's control is limited in such a way that fast forward and reverse playing is not performed and skip forward and backward are restricted by imposing a lower limit on playing time of skipped video, said lower limit being greater than a time of typical commercial break so that a part of video whose playing time is greater than the time of typical commercial break can be skipped but a part of video whose playing time is lesser than or equal to the time of typical commercial break cannot be skipped;

thereby preventing a user from selectively skipping commercials without missing pieces of program itself and thus discouraging skipping when the user wants to watch an entire program, but still enabling quick browsing before watching the entire program as well as moving fast to any part of the program for watching that part again.

2. The system of claim 1 wherein the video player for playing the encrypted video data is a hardware video player.

3. The system of claim 1 wherein the video player for playing the encrypted video data is a software video player.

4. The system of claim 3 further comprising a server at the distributor side, wherein the software video player is generated at the distributor side by the server and then electronically delivered to the user side.

5. The system of claim 4 wherein the software video player has an expiration date in order to address the time-sensitive nature of advertising included in the video program.

* * * * *